United States Patent [19]

Jolly

[11] Patent Number: 4,941,986

[45] Date of Patent: Jul. 17, 1990

[54] LIQUID COMPOSITIONS CONTAINING ORGANIC NITRO COMPOUNDS

[75] Inventor: Scott T. Jolly, Mentor, Ohio

[73] Assignee: The Lubrizol Corporation, Wickliffe, Ohio

[21] Appl. No.: 324,587

[22] Filed: Mar. 16, 1989

[51] Int. Cl.$^5$ ................. C10M 105/52; C10M 133/32
[52] U.S. Cl. .................... 252/51.5 R; 252/58; 252/68
[58] Field of Search ........... 252/68, 58, 51.5 R

[56] References Cited

U.S. PATENT DOCUMENTS

| | | | |
|---|---|---|---|
| 2,730,489 | 1/1956 | Lewis | 252/68 |
| 3,183,189 | 5/1965 | Hodge | 252/51.5 R |
| 3,437,693 | 4/1969 | Frump | 252/51.5 R |
| 3,618,461 | 11/1971 | Parker | 252/58 |
| 4,036,770 | 7/1977 | Espenscheid et al. | 252/51.5 R |
| 4,248,726 | 2/1981 | Uchinuma et al. | 252/52 A |
| 4,267,064 | 5/1981 | Sasaki et al. | 252/52 A |
| 4,428,854 | 1/1984 | Enjo et al. | 252/69 |
| 4,431,557 | 2/1984 | Shimizu et al. | 252/52 A |
| 4,454,052 | 6/1984 | Shoji et al. | 252/68 |
| 4,559,154 | 12/1985 | Powell | 252/69 |
| 4,755,316 | 7/1988 | Magid et al. | 252/68 |

Primary Examiner—William R. Dixon, Jr.
Assistant Examiner—E. McAvoy
Attorney, Agent, or Firm—Robert A. Franks; Frederick D. Hunter; Forrest L. Collins

[57] ABSTRACT

A liquid composition is described which comprises
(A) a major amount of at least one fluorine containing hydrocarbon containing one or two carbon atoms; and
(B) a minor amount of a soluble organic lubricant comprising at least one organic nitro compound characterized by the formulae $$R_zN(H)_x[CH_2C(R^1)(R^2)NO_2]_y \qquad (I)$$

and $$CH_2[N(R)CH_2C(R^1)(R^2)NO_2]_2 \qquad (II)$$

wherein
R is a hydrocarbyl group, a polyaminoalkyl group, or $R^4XR^5$- wherein $R^4$ is H, hydrocarbyl, hydroxyalkyl or aminoalkyl, X is O or $NR^6$, wherein $R^6$ is H or a nitroalkyl group, and $R^5$ is an alkylene group, or $R^4X$ is a morpholinyl group attached to $R^5$ through the nitrogen atom; and
$R^1$ and $R^2$ are each independently H or lower aliphatic groups;
x is 0 or 1;
y is 1 or 2; and
z is 1 or 2, provided that the sum of x, y and z is 3.
Liquid compositions also are described containing fluorine-containing hydrocarbons also containing other halogen such as chlorine. The liquid compositions are useful particularly as refrigeration liquids in refrigerators and air-conditioners including auto, home and industrial air-conditioners.

24 Claims, No Drawings

LIQUID COMPOSITIONS CONTAINING ORGANIC NITRO COMPOUNDS

FIELD OF THE INVENTION

This invention relates to liquid compositions comprising a major amount of at least one fluorine-containing hydrocarbon, and a minor amount of at least one lubricant. More particularly, the invention relates to liquid compositions useful as refrigeration liquids.

BACKGROUND OF THE INVENTION

Chlorofluorocarbons, generally referred to in the industry as CFCs, have been widely used as propellants in aerosols, although use in aerosols has been diminishing in recent years because of demands of environmentalists for the reduction if not a complete ban on the use of CFCs because of the detrimental effect of CFCs on the atmosphere's ozone layer. CFCs also have been used because of their unique combination of properties as refrigerants, foam-blowing agents, and specialty solvents within the electronics and aerospace industries. Examples of CFCs which have been utilized for these purposes include CFC-11 which is chlorotrifluoromethane, CFC-12 which is dichlorodifluoromethane, and CFC-113 which is 1,2,2-trifluoro-1,1,2-trichloroethane.

Since 1976, when the aerosol industry began to feel the pressure to reduce if not eliminate the use of CFCs, the aerosol industry has progressively moved toward the substitution of hydrocarbon propellants for CFC propellants. The hydrocarbons, such as butane, are readily available and inexpensive, and the quality of the final product generally has been unaffected by the substitution of propellants. However, the problem of finding a safe replacement of CFC refrigerants and foam-blowing agents has been more difficult to solve. Several replacement candidates have been suggested as alternatives to the fully halogenated hydrocarbons, and these include halogenated hydrocarbons containing at least some hydrogen atoms such as HCFC-22 which is difluorochloromethane, HCFC-123 which is 1,1-dichloro2,2-trifluoroethane, HFC-134a which is 1,1,1,2-tetrafluoroethane and HCFC-141b which is 1,1-dichloro-1fluoroethane.

The ozone depletion potential of these proposed substitutes is significantly less than the ozone depletion potential of the previously used CFCs. The ozone depletion potential is a relative measure of the capability of the material to destroy the ozone layer in the atmosphere. It is a combination of the percentage by weight of chlorine (the atom that attacks the ozone molecule) and the lifetime in the atmosphere. HCFC-22 and HFC-134a generally are recommended as being candidates in refrigerant applications, and HFC-134a is particularly attractive because its ozone depletion potential has been reported as being zero.

In order for any of the replacement materials to be useful as refrigerants, the materials must be compatible with the lubricant utilized in the compressor. The presently used refrigerants such as CFC-12 are readily compatible with mineral lubricating oils which are utilized as the lubricant in air-conditioner compressors. The above-described refrigerant candidates, however, have different solubility characteristics than the refrigerants presently in use. For example, mineral lubricating oil is incompatible (i.e., insoluble) with HFC134a. Such incompatibility results in unacceptable compressor life in compression-type refrigeration equipment including refrigerators and air-conditioners including auto, home and industrial air-conditioners. The problem is particularly evident in automotive air-conditioning systems since the compressors are not separately lubricated, and a mixture of refrigerant and lubricant circulates throughout the entire system.

In order to perform as a satisfactory refrigeration liquid, the mixture of refrigerant and lubricant must be compatible and stable over a wide temperature range such as from about 0° C. and above 80° C. It is generally desirable for the lubricants to be soluble in the refrigerant at concentrations of about 5 to 15% over a temperature range of from $-40°$ C. to 80° C. These temperatures generally correspond to the working temperatures of an automobile air-conditioning compressor. In addition to thermal stability, the refrigeration liquids must have acceptable viscosity characteristics which are retained even at high temperatures, and the refrigeration liquid should not have a detrimental effect on materials used as seals in the compressors.

Compositions comprising a tetrafluoroethane and polyoxyalkylene glycols are discussed in U.S. Pat. No. 4,755,316. The compositions are useful in refrigeration systems. Refrigeration oils are described in U.S. Pat. Nos. 4,248,726 and 4,267,064 which comprise mixtures of a polyglycol and 0.1 to 10% of glycidyl ether type epoxy compounds, or epoxidized fatty acid monoesters, and optionally, epoxidized vegetable oil. The lubricating oils are reported to be useful in refrigerators using a halogen-containing refrigerant such as Freons 11, 12, 13, 22, 113, 114, 500 and 502 (available from DuPont), and in particular with Freon 12 or 22.

U.S. Pat. No. 4,431,557 describes fluid compositions comprised of a fluoro- and chloro-containing refrigerant, a hydrocarbon oil, and an alkylene oxide additive compound which improves the thermal resistance of the oil in the presence of the refrigerant. Examples of hydrocarbon oils include mineral oil, alkyl benzene oil, dibasic acid ester oil, polyglyools, etc. The composition may contain other additives including loadcarrying additives such as phosphorus acid esters, phosphoric acid esters, etc. Examples of fluorocarbon refrigerants include R-11, R-12, R-113, R-114, R-500, etc.

U.S. Pat. No. 4,428,854 describes absorption refrigerant compositions for use in refrigeration systems comprising 1,1,1,2-tetrafluoroethane and an organic solvent capable of dissolving the ethane. Among the solvents disclosed are organic amides, acetonitrile, N-methyl pyrroles, N-methyl pyrrolidine, N-methyl-2-pyrrolidone, nitromethane, various dioxane derivatives, glycol ethers, butyl formate, butyl acetate, diethyl oxalate, diethyl malonate, acetone, methyl ethyl ketone, other ketones and aldehydes, triethyl phosphoric triamide, triethylene phosphate, triethyl phosphate, etc.

Stabilized absorption compositions comprising (a) a halogenated hydrocarbon refrigerant, (b) a liquid absorbent of a polyethylene glycol methyl ether, and (c) at least one stabilizer are described in U.S. Pat. No. 4,454,052. Examples of stabilizers include phosphate esters, epoxy compounds, and organotin compounds. The polyethylene glycol methyl ether-type compounds are of the general formula $$CH_3-O-(CH_2H_4O)_n R$$

wherein n is an integer of 1 to 6, and R is H, $CH_3-$ or $CH_3CO-$. A variety of halogenated hydrocarbons are described including 1,1,-difluoromethane, 1,1,1,2-tetrafluoroethane, etc.

U.S. Pat. No. 4,559,154 relates to absorption heat pumps utilizing as working fluid, a saturated fluorohydrocarbon or fluorohydrocarbon ether having from 3 to 5 carbon atoms. Solvents reported to be useful with such fluorohydrocarbons include ethers such as tetraglyme, amides which can be lactams such as the N-alkyl pyrrolidones, sulfonamides and ureas including cyclic ureas.

SUMMARY OF THE INVENTION

A liquid composition is described which comprises (A) a major amount of at least one fluorine containing hydrocarbon containing one or two carbon atoms; and (B) a minor amount of a soluble organic lubricant comprising at least one organic nitro compound characterized by the formulae $$R_2N(H)_x[CH_2C(R^1)(R^2)NO_2]y \quad (I)$$

and $$CH_2[N(R)CH_2C(R^1)(R^2)NO_2]_2 \quad (II)$$

wherein R is a hydrocarbyl group, a polyaminoalkyl group, or $R^4XR^5$— wherein $R^4$ is H, hydrocarbyl, hydroxyalkyl or aminoalkyl, X is 0 or $NR^6$, wherein $R^6$ is H or a nitroalkyl group, and $R^5$ is an alkylene group, or $R^4X$ is a morpholinyl group attached to $R^5$ through the nitrogen atom; and $R^1$ and $R^2$ are each independently H or lower aliphatic groups;

x is 0 or 1;

Y is 1 or 2; and z is 1 or 2, provided that the sum of x, y and z is 3.

Liquid compositions also are described containing fluorine-containing hydrocarbons also containing other halogen such as chlorine. The liquid compositions are useful particularly as refrigeration liquids in refrigerators and air-conditioners including auto, home and industrial air-conditioners.

DESCRIPTION OF THE PREFERRED EMBODIMENTS

Throughout this specification and claims, all parts and percentages are by weight, temperatures are in degrees Celsius, and pressures are at or near atmospheric pressure unless otherwise clearly indicated.

As used in this specification and in the appended claims, the terms "hydrocarbyl" and "hydrocarbylene" denote a group having a carbon atom directly attached to the polar group and having a hydrocarbon or predominantly hydrocarbon character within the context of this invention. Such groups include the following:

(1) Hydrocarbon groups; that is, aliphatic, (e.g., alkyl or alkenyl), alicyclic (e.g., cyoloalkyl or cycloalkenyl), and the like, as well as cyclic groups wherein the ring is completed through another portion of the molecule (that is, any two indicated substituents may together form an alicyclic group). Such groups are known to those skilled in the art. Examples include methyl, ethyl, octyl, decyl, octadecyl, cyolohexyl, etc.

(2) Substituted hydrocarbon groups; that is, groups containing non-hydrocarbon substituents which, in the context of this invention, do not alter the predominantly hydrocarbon character of the group. Those skilled in the art will be aware of suitable substituents. Examples include halo, hydroxy, alkoxy, etc.

(3) Hetero groups; that is, groups which, while predominantly hydrocarbon in character within the context of this invention, contain atoms other than carbon in a chain or ring otherwise composed of carbon atoms. Suitable hetero atoms will be apparent to those skilled in the art and include, for example, nitrogen, oxygen and sulfur.

In general, no more than about three substituents or hetero atoms, and preferably no more than one, will be present for each 10 carbon atoms in the hydrocarbyl group.

Terms such as "alkyl", "alkylene", etc. have meanings analogous to the above with respect to hydrocarbyl and hydrocarbylene.

The term "hydrocarbon-based" also has the same meaning and can be used interchangeably with the term hydrocarbyl when referring to molecular groups having a carbon atom attached directly to the polar group.

The term "lower" as used herein in conjunction with terms such as hydrocarbyl, hydrocarbylene, alkylene, alkyl, alkenyl, alkoxy, and the like, is intended to describe such groups which contain a total of up to 7 carbon atoms.

(A) Fluorine-Containing Hydrocarbon.

The liquid compositions of the present invention comprise a major amount of at least one fluorine-containing hydrocarbon. That is, the fluorine-containing hydrocarbons contain at least one C—H bond as well as C—F bonds. In addition to these two essential types of bonds, the hydrocarbon also may contain other carbon-halogen bonds such as C—Cl bonds. Because the liquid compositions of the present invention are primarily intended for use as refrigerants, the fluorine-containing hydrocarbon preferably contains one or two carbon atoms, and more preferably two carbon atoms.

As noted above, the fluorine-containing hydrocarbons useful in the liquid compositions of the present invention may contain other halogens such as chlorine. However, in one preferred embodiment, the hydrocarbon contains only carbon, hydrogen and fluorine. These compounds containing only carbon, hydrogen and fluorine are referred to herein as fluorohydrocarbons. The hydrocarbons containing chlorine as well as fluorine and hydrogen are referred to as chlorofluorohydrocarbons. The fluorine-containing hydrocarbons useful in the composition of the present invention are to be distinguished from the fully halogenated hydrooarbons which have been and are being used as propellants, refrigerants and blowing agents such as CFC-11, CFC-12 and CFC-113 which have been described in the background.

Specific examples of the fluorine-containing hydrocarbons useful in the liquid compositions of the present invention, and their reported ozone depletion potentials are shown in the following Table I.

TABLE I

| Compound Designation | Formula | ODP* |
|---|---|---|
| HCFC-22 | $CHClF_2$ | 0.05 |
| HCFC-123 | $CHCl_2CF_3$ | <0.05 |
| HCFC-141b | $CH_3CCl_2F$ | <0.05 |
| HFC-134a | $CH_2FCF_3$ | 0 |

*Ozone depletion potential as reported in Process Engineering, pp. 33–34, July, 1988.

Examples of other fluorine-containing hydrocarbons which may be useful in the liquid. compositions of the present invention include trifluoromethane (HCFC-23), 1,1,1-trifluoroethane (HCFC-143a), 1,1-difluoroethane (HCFC152a), 2-chloro-1,1,1,2-tetrafluoroethane (HCFC-124), 1-chloro-1,1,2,2-tetrafluoroethane (HCFC-124a), 1-chloro-1,1-difluoroethane (HCFC-142b), and 1,1,2,2-tetrafluoroethane (HCFC-134).

In general, fluorine-containing hydrocarbons which are useful as refrigerants are fluoromethanes and fluoroethanes boiling at a relatively low temperature at atmospheric pressure, e.g., below 30° C. Mixtures of fluorine-containing hydrocarbons may be used, and the amount of each fluorohydrocarbon in the mixture may be varied as desired. Examples of fluorohydrocarbon mixtures useful as (A) include: 142(b)/22; 134(a)/23; 22/124/152(a), etc. The useful fluorocarbon refrigerants serve to transfer heat in a refrigeration system by evaporating and absorbing heat at a low temperature and pressure, e.g., at ambient temperature and atmospheric pressure, and by releasing heat on condensing at a higher temperature and pressure.

The liquid compositions of the present invention contain a major amount of at least one fluorine-containing hydrocarbon. More generally, the liquid compositions will comprise from about 50% to about 99% by weight of the fluorine-containing hydrocarbon(s). In another embodiment, the liquid compositions contain from about 70% to about 99% by weight of the fluorine-containing hydrocarbon(s).

(B) Soluble Organic Lubricant:

In addition to the fluorine-containing hydrocarbon, the liquid compositions of the present invention contain a minor amount of a soluble organic lubricant comprising at least one organic nitro compound characterized by the formulae $$R_zN(H)_x[CH_2C(R^1)(R^2)NO_2]_y \quad (I)$$
and
$$CH_2[N(R)CH_2C(R^1)(R^2)NO_2]_2 \quad (II)$$

wherein R is a hydrocarbyl group, a polyaminoalkyl group, or $R^4XR^5$— wherein $R^4$ is H, hydrocarbyl, hydroxyalkyl or aminoalkyl, X is O or $NR^6$, wherein $R^6$ is H or a nitroalkyl group, and $R^5$ is an alkylene group, or $R^4X$ is a morpholinyl group attached to $R^5$ through the nitrogen atom; and $R^1$ and $R^2$ are each independently H or lower aliphatic groups; x is 0 or 1; y is 1 or 2; and z is 1 or 2, provided that the sum of x, y and z is 3.

The hydrocarbyl groups R in Formulae I and II may be substituted or unsubstituted alkyl or alkenyl groups and these groups may contain substituents such as phenyl groups or non-hydrocarbon groups such as nitro, amino, halo, etc. In one embodiment, the R groups will be alkyl or alkenyl groups containing from 2 to about 50 carbon atoms. Examples of such groups include ethyl, propyl, butyl, isobutyl, pentyl, octyl, nonyl, dodecyl, dococyl, 5-chlorohexyl, 2,3,5-trimethylheptyl, oleyl, stearyl, etc. The alkyl and alkenyl groups R may be linear or branched chain alkyl groups, and in some embodiments, the branched chain alkyl groups are preferred since the compounds containing branching appear to be more soluble in the fluorine-containing hydrocarbons.

In another embodiment, the R group in Formulae I, and II may be $R^4XR^5$— wherein $R^4$ is H, hydrocarbyl, hydroxyalkyl, or amino alkyl, X is O or $NR^6$, wherein $R^6$ is H or a nitro alkyl group and $R^5$ is an alkylene group, or $R^4X$ is a morpholinyl group attached to the alkylene group $R^5$ through the nitrogen atom. The hydrocarbyl, hydroxyalkyl and amino alkyl groups $R^4$ generally will contain from 1 to about 20 carbon atoms, and the alkylene group $R^5$ is a lower straight or branched chain alkylene group.

As noted, the R group may be $R^4XR^5$ wherein $R^4$ is hydrogen, hydrocarbyl, hydroxyalkyl or amino alkyl, and X is O or $NR^6$ wherein $R^6$ is H or a nitroalkyl group and $R^5$ is an alkylene group. The hydrocarbyl groups generally are alkyl groups, and such alkyl groups, as well as the hydroxyalkyl and aminoalkyl groups $R^4$ generally contain from 1 to about 20 carbon atoms. Examples of hydroxyalkyl groups include hydroxymethyl, hydroxyethyl, hydroxypropyl, etc., and examples of aminoalkyl groups include aminoethyl, aminopropyl, aminobutyl, etc. The alkylene groups $R^5$ generally are lower alkylene groups such as —CH$_2$—, —(CH$_2$)$_2$—, —(CH$_2$)$_3$—, —CH$_2$—CH(CH$_3$)—, etc.

The groups $R^1$ and $R^2$ are independently hydrogen or lower aliphatic groups. Examples of lower aliphatic groups include methyl, ethyl, n-propyl, isopropyl, n-butyl and 2-methylpropyl.

The organic nitro compounds useful as organic lubricants in the liquid compositions of the present invention and represented by Formulae I and II may be prepared generally by reacting an amine which may be a primary or secondary amine with a nitro compound in the presence of formaldehyde. Consistent with Formulae I and II, the amine may be represented by the formula $$R_zN(H)_x$$

wherein z is 1 or 2 and x is 1 or 2, and the sum of z and x is 3. The nitro compound which is utilized in the reaction may be represented by the formula $$R^1(R^2)C(H)—NO_2$$

wherein $R^1$ and $R^2$ are as defined in Formulae I and II. When $R^1$ and $R^2$ are methyl groups, the nitro compound is 2-nitropropane. Other nitro compounds which may be utilized in the reaction include nitromethane, nitroethane, 1-nitropropane, and other nitroalkanes wherein there is at least one hydrogen on the carbon to which the nitro group is attached.

Preferred organic nitro compounds of the present invention are those derived from primary amines reacted with one or two equivalents of formaldehyde and one or two equivalents of 2-nitropropane to form compounds represented by the following Formulae III and IV $$RNH[CH_2C(CH_3)_2NO_2] \quad (III)$$
$$RN[CH_2C(CH_3)_2NO_2]_2 \quad (IV)$$

wherein R is an alkyl or alkenyl group, or a polyamino alkyl group, or $R^4XR^5$— wherein $R^4$ is H or hydrocarbyl, X is O or $NR^6$ wherein $R^6$ is H or a nitroalkyl group, and $R^5$ is a lower straight chain or branched chain alkylene group, or $R^4X$ is a morpholino group attached to $R^5$ through the nitrogen atom.

In another embodiment, the organic nitro compounds of the present invention may be prepared by reacting a primary amine with excess formaldehyde in the presence of the nitro compound to cross-link the nitrogen atoms of the starting primary amine with one mole of formaldehyde, and the excess formaldehyde is then available for the Mannich reaction to condense the nitro groups onto one or both of the remaining hydrogens. For example, the above reaction can be effected by utilizing two moles of the primary amine such as oleylamine, at least three moles of formaldehyde and at least two moles of the nitro compound, typically 2-nitropropane. This reaction can be illustrated as follows $$2RNH_2 + 3CH_2O + 2R_1(R_2)C(H)NO_2 \longrightarrow \quad (V)$$

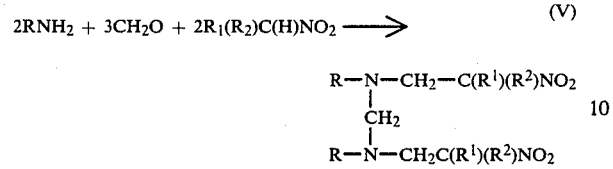

The typical conditions for reacting an amine, an aldehyde and the nitro compound include preparing a mixture of the three components and heating the mixture with stirring at a temperature between about 50° and 150° C. Generally, the reaction may proceed at any point from the lowest temperature at which the reaction takes place up to but not including the decomposition temperature of the component which decomposes first. As water is formed during the reaction, it generally is removed from the reaction vessel to facilitate and promote the reaction. Typically, the reaction may be conducted at a temperature at which the water is effectively removed by evaporation either at atmospheric pressure or under vacuum. The desired products generally can be prepared by the above reactions at a reaction time of from about 12 hours and more particularly from 2 to about 5 hours.

The following examples illustrate the preparation of the organic nitro compounds useful in the liquid compositions of the present invention.

EXAMPLE 1

A mixture comprising 2 moles of oleylamine, 2 moles of 2-nitropropane and 3 moles of paraformaldehyde is prepared, and nitrogen gas is bubbled through the reaction mixture as it is heated to the reflux temperature. The reaction proceeds exothermically over a period of about 4 hours with water being collected in a trap. Evolved 2-nitropropane is returned to the reaction vessel. The reaction proceeds, as measured by the water volume collected divided by theory, to 93% completion. The product then is filtered and recovered.

EXAMPLE 2

The amine utilized in this reaction is characterized by the formula n-$C_{13}H_{27}OCH_2CH_2CH_2NH_2$ The amine is commercially available under the general trade designation SURFAM PA-17B from Sea Land Chemical. A mixture of 274 parts (1 mole) of the amine, 178 parts (2 moles) of 2-nitropropane and 30 parts (1 mole) of formaldehyde is prepared with stirring, and the mixture is heated to about 100° C. An azeotrope of water/2-nitropropane evolves. The reaction is continued until the theoretical amount of water is evolved, and excess nitropropane is stripped by applying a slight vacuum. The product is a yellow liquid which is filtered. The product contains 7.57% nitrogen (theory 7.47), and infrared analysis of the product indicates very little hydroxyl content and a nitro peak at 1530 cm$^{-1}$. The product obtained in this example contains material having the general structural formula n-$C_{13}H_{27}OCH_2CH_2CH_2NHCH_2C(CH_3)_2NO_2$

EXAMPLE 3

The general procedure of Example 2 is repeated utilizing 1 mole of SURFAM PA-17B, 3 moles of 2-nitropropane and 2 moles of paraformaldehyde. The compound obtained in this manner contains 7.57% nitrogen (theory, 7.47%) and comprises material of the proposed formula n—$C_{13}H_{27}OCH_2CH_2CH_2N[CH_2C(CH_3)_2NO_2]_2$

EXAMPLE 4

Aminopropyl morpholine (1 mole) is reacted with 1 mole of oleylchloride (RCl) to form a compound comprising the structure

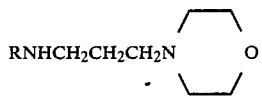

This amine (1 mole) is reacted with two moles of nitropropane and 1 mole of formaldehyde by heating the mixture to the reflux temperature (about 120° C.). The reaction mixture is heated for about 6 hours and stripped for 30 minutes at 70°–100° C. under a slight vacuum. The residue is filtered and the filtrate is recovered as the desired product which may be characterized by the following formula

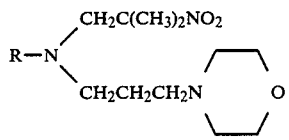

EXAMPLE 5

A mixture of 146 parts (2 moles) of n-butylamine and 178 parts (2 moles) of 2-nitropropane is prepared, and 90 parts (3 moles) of paraformaldehyde are added. This mixture is stirred and an exothermic reaction begins raising the temperature of the mixture to the reflux temperature of about 90° C. When the refluxing subsides, the material which is collected in the trap is returned to the flask and this mixture is maintained at reflux until about 48 parts of water are collected. The residue is the desired product containing 14.5% nitrogen (theory 15.5) The product of this example contains material having a structural formula similar to that of Formula V wherein R is n-butyl, and $R^1$ and $R^2$ are methyl groups.

EXAMPLE 6

The amine utilized in this example is Duomeen O available from Akzo Chemie, which has the general formula $R^4N(H)CH_2CH_2CH_2NH_2$ where R is an alkyl group containing 18 carbon atoms. A mixture is prepared containing 350 parts (1 mole) of this amine and 530 parts (6 moles) of 2-nitropropane. The mixture is stirred and about 18 parts of paraformaldehyde is added. The reaction mixture is heated to about 100° C. and an additional 72 parts (a total of 3 moles) of paraformaldehyde are added slowly, and the water formed by the reaction is collected in a trap. An infrared spectrum of the residue shows no N-H, no C=O, but a strong NO₂ peak. The product contains 10.2% nitrogen (theory 10.7%) and contains a material having the proposed structure

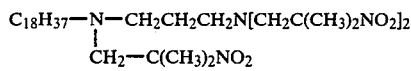

EXAMPLE 7

A mixture of 370 parts (2 moles) of dodecylamine, 120 parts (4 moles) of paraformaldehyde and 356 parts (4 moles) of 2-nitropropane is prepared, stirred and heated to about 80° C. where upon an exotherm begins. Water is removed as it is formed in the reaction. The residue is the desired product containing 10.0% nitrogen (theory 10.85%). The product contains material having the following proposed structure.

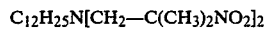

EXAMPLE 8

A reactor is charged with 570 parts (3 moles) of a branched 12 carbon atom-containing amine, and 45 parts (1.5 moles) of paraformaldehYde are added at room temperature. This mixture is heated to 100° C., and when a theoretical amount of water has been evolved, 267 parts (3 moles) of 2-nitropropane are added followed by an additional 90 parts (3 moles) of paraformaldehyde. The reaction mixture is maintained at about 115° C. for two hours, stripped for one hour at 100° C. under vacuum, and then filtered. The filtrate is the desired product containing 9.44% nitrogen (theory 9.6). The product contains a material characterized by Formula V wherein each R group is a 12 carbon atom branched alkyl group and each $R^1$ and $R^2$ are methyl groups.

EXAMPLE 9

A mixture is prepared containing 380 parts (2 moles) of a 12 carbon atom branched chain aliphatic amine, 356 parts (4 moles) of 2-nitropropane and 60 parts (2 moles) of paraformaldehyde. The mixture is heated to about 90° C., and a water/nitropropane azeotrope evolves. About 35 parts of water is collected in about 2 to 3 hours. The reaction mixture then is stripped to remove excess 2-nitropropane. The residue is the desired product containing 9.66% nitrogen (theory 9.06).

The organic lubricants characterized by Formulae I and II preferably contain branched alkyl or alkylene groups and generally are free of acetylenic and aromatic unsaturation. Some compounds of Formulae I and II which contain such unsaturation may be insoluble in the fluorine-containing hydrocarbons. The soluble lubricants of this invention also are preferably free of olefinic unsaturation except that some olefinic unsaturation may be present so long as the lubricant is soluble.

The organic nitro compounds are soluble in the fluorine-containing hydrocarbons and, in particular, in the fluorohydrocarbons such as 1,1,1,2-tetrafluoroethane. The lubricants are soluble over a wide temperature range and, in particular, at low temperatures. The solubility of the lubricants in fluorohydrocarbons such as 1,1,1,2-tetrafluoroethane at low temperatures is determined in the following manner. The lubricant (0.5 gram) is placed in a thick-walled glass vessel equipped with a removable pressure gauge. The tetrafluoroethane (4.5 grams) is condensed into the cooled (−40° C.) glass vessel, and the contents are warmed to the desired temperature and mixed to determine if the lubricant is soluble in the tetrafluoroethane. If soluble, the temperature of the mixture is reduced until a separation and/or precipitate is observed. The results of this solubility test conducted with several examples of the organic nitro lubricants of the present invention are summarized in the following Table II.

TABLE II

| Liquid Containing Product of Example | Solubility °C. (ppt.) |
|---|---|
| 5 | −40 |
| 7 | −20 |
| 8 | −35 |

The liquid compositions of the present invention comprise a major amount of a fluorine-containing hydrocarbon and a minor amount of at least one soluble organic lubricant comprising at least one organic nitro compound of the types described above with respect to Formulae I and II. By "major amount" is meant an amount greater than 50% by weight such as 50.5%, 70%, 99%, etc. The term "minor amount" includes amounts less than 50% by weight such as 1%, 5%, 20%, 30% and up to 49.9%. In one embodiment, the liquid compositions of the present invention will comprise from about 70% to about 99% of the fluorine-containing hydrocarbon and from about 1 to about 30% by weight of the lubricant. In other embodiments, the liquid compositions of the present invention may contain from about 5% to about 20% by weight of the lubricant.

The liquid compositions of the present invention are characterized as having improved thermal and chemical stability over a wide temperature range. Other additives, if soluble in the liquid, known to be useful for improving the properties of halogen-containing hydrocarbon refrigerants can be included in the liquid compositions of the present invention to improve the characteristics of the liquid as a refrigerant. However, hydrocarbon oils such as mineral oil generally are not included in and are most often excluded from the liquid compositions of the invention, particularly when the fluorine-containing hydrocarbon contains no other halogen. Polyglycols and alkyl ethers which have been suggested in the prior art as useful solvents for fluorine-containing hydrocarbons are not required in the liquid compositions of the present invention and are generally omitted from the liquid compositions.

The additives which may be included in the liquid compositions of the present invention to enhance the performance of the liquids include extreme-pressure and anti-wear agents, oxidation and thermal-stability improvers, corrosion-inhibitors, viscosity-index improvers, pour point and/or floc point depressants, detergents, dispersants, anti-foaming agents, viscosity adjusters, etc. As noted above, these supplementary additives must be soluble in the liquid compositions of the invention. Included among the materials which may be used as extreme-pressure and anti-wear agents are phosphates, phosphate esters, phosphites, thiophosphates such as zinc diorganodithiophosphates, dithiocarbamates, chlorinated waxes, sulfurized fats and olefins, organic lead compounds, fatty acids, molybdenum complexes, borates, halogen-substituted phosphorous compounds, sulfurized Diels Alder adducts, organic sulfides, metal salts of organic acids, etc. Sterically hindered phenols, aromatic amines, dithiophosphates, phosphites, sulfides and metal salts of dithioacids are useful examples of oxidation and thermal stability improvers. Compounds useful as corrosion-inhibitors include organic acids, organic amines, organic phosphates, organic alcohols, metal sulfonates, organic phosphites, etc. VI improvers include polyolefins such as polyesterbutene, polymethacrylate, polyalkyl styrenes, etc. Pour point and floc point depressants include polymethacrylates, ethylene-vinyl acetate copolymers, succinamic acid-olefin copolymers, ethylene-alpha olefin copolymers, etc. Detergents include sulfonates, long-chain alkyl-substituted aromatic sulfonic acids, phosphonates, phenylates, metal salts of alkyl phenols, alkyl phenol-aldehyde condensation products, metal salts of substituted salicylates, etc. Silicone polymers are a well known type of antifoam agent. Viscosity adjusters are exemplified by polyisobutylene, polymethacrylates, polyalkyl styrenes, naphthenic oils, alkyl benzene oils, polyesters, polyvinyl chloride, polyphosphates, etc.

The liquid compositions of the present invention are particularly useful as refrigerants in various refrigeration systems which are compression-type systems such as refrigerators, freezers, and air-conditioners including automotive, home and industrial air-conditioners. The following examples are illustrative of the liquid compositions of the present invention.

|  | Parts by Wt. |
| --- | --- |
| Example A |  |
| 1,1,1,2-tetrafluoroethane (HCFC-134a) | 90 |
| Lubricant of Example 2 | 10 |
| Example B |  |
| 1,1,2,2-tetrafluoroethane | 85 |
| Lubricant of Example 4 | 15 |
| Example C |  |
| HCFC-134a | 95 |
| Lubricant of Example 5 | 5 |
| Example D |  |
| HCFC-134a | 80 |
| Product of Example 1 | 20 |
| Example E |  |
| HCFC-134a | 85 |
| Product of Example 4 | 15 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. A liquid composition comprising
    (A) a major amount of at least one fluorine containing hydrocarbon containing one or two carbon atoms; and
    (B) a minor amount of a soluble organic lubricant comprising at least one organic nitro compound characterized by the formulae $$R_zN(H)_x[CH_2C(R^1)(R^2)NO_2]_y \quad (I)$$
    and
    $$CH_2[N(R)CH_2C(R^1)(R^2)NO_2]_2 \quad (II)$$

wherein
    R is a hydrocarbyl group, a polyaminoalkyl group, or $R^4XR^5-$ wherein $R^4$ is H, hydrocarbyl, hydroxyalkyl or aminoalkyl, X is O or $NR^6$, wherein $R^6$ is H or a nitroalkyl group, and $R^5$ is an alkylene group, or $R^4X$ is a morpholinyl group attached to $R^5$ through the nitrogen atom; and
    $R^1$ and $R^2$ are each independently H or lower aliphatic groups;
    x is 0 or 1;
    y is 1 or 2; and
    z is 1 or 2, provided that the sum of x, y and z is 3.

2. The liquid composition of claim 1 wherein fluorine is the only halogen in the fluorine-containing hydrocarbon (A).

3. The liquid composition of claim 1 wherein the fluorine-containing hydrocarbon (A) is 1,1,1,2-tetrafluoroethane.

4. The liquid composition of claim 1 comprising from about 70 to about 99% by weight of the fluorine-containing hydrocarbon (A) and from about 1 to about 30% by weight of the soluble organic lubricant (B).

5. The liquid composition of claim 1 wherein the organic nitro compound is characterized by Formula I and x, y and z are each 1.

6. The liquid composition of claim 1 wherein R is an alkyl or alkenyl group containing from 2 to about 50 carbon atoms or $$R^4OR^5-$$

wherein $R^4$ is a hydrocarbyl or a hydroxyalkyl group containing from 1 to about 20 carbon atoms, and $R^5$ is a lower straight or branched chain alkylene group.

7. The liquid composition of claim 1 wherein the organic nitro compound is characterized by Formula I, $R^1$ and $R^2$ are lower alkyl groups, x is 0, y is 2 and z is 1.

8. A liquid composition comprising
    (A) from about 70 to about 99% by weight of at least one fluorine-containing hydrocarbon containing 1 or 2 carbon atoms and wherein fluorine is the only halogen present; and
    (B) from about 1 to about 30% by weight of a soluble organic lubricant comprising at least one organic nitro compound characterized by the formulae $$R_zN(H)_x[CH_2C(R^1)(R^2)NO_2]_y \quad (I)$$
    and
    $$CH_2[N(R)CH_2C(R^1)(R^2)NO_2]_2 \quad (II)$$

wherein
    R is a hydrocarbyl group, a polyaminoalkyl group, or $R^4XR^5-$ wherein $R^4$ is H, hydrocarbyl, hydroxyalkyl or aminoalkyl, X is O or $NR^6$, wherein $R^6$ is H or a nitroalkyl group, and $R^5$ is an alkylene group, or $R^4X$ is a morpholinyl group attached to $R^5$ through the nitrogen atom; and
    $R^1$ and $R^2$ are each independently H or lower aliphatic groups;
    x is 0 or 1;
    y is 1 or 2; and
    z is 1 or 2, provided that the sum of x, y and z is 3.

9. The liquid composition of claim 8 wherein the fluorine-containing hydrocarbon (A) is 1,1,1,2-tetrafluoroethane.

10. The liquid composition of claim 8 wherein the organic lubricant is characterized by Formula I, x is 0, y is 2 and z is 1.

11. The liquid composition of claim 10 wherein R is a linear or branched chain alkyl group containing from 2 to about 50 carbon atoms.

12. The liquid composition of claim 10 wherein $R^1$ and $R^2$ are each independently lower alkyl groups.

13. The liquid composition of claim 8 wherein the lubricant is characterized by Formula II and R is a linear or branched chain alkyl group containing from 2 to 15 carbon atoms.

14. The liquid composition of claim 8 wherein R is $R^4OR^5-$ wherein $R^4$ is an alkyl or hydroxyalkyl group containing from 1 to about 20 carbon atoms and $R^5$ is $-CH_2-$, $-(CH_2)_2-$, $-(CH_2)_3-$ or $-CH_2-CH(CH_3)-$.

15. The liquid composition of claim 8 wherein $R^1$ and $R^2$ are each independently lower alkyl groups.

16. The liquid composition of claim 8 wherein the organic lubricant (B) is free of acetylenic and aromatic unsaturation.

17. A liquid composition comprising
    (A) from about 70 to about 99% by weight of 1,1,1,2-tetrafluoroethane; and
    (B) from about 1 to about 30% by weight of a soluble organic lubricant comprising at least one organic nitro compound characterized by the formula $$R_2N(H)_x[CH_2C(R^1)(R^2)NO_2]_y \qquad (I)$$

wherein R is a straight or branched chain alkyl group containing from 2 to about 15 carbon atoms, $R^1$ and $R^2$ are each independently H or lower aliphatic groups, x is 0 or 1, y is 1 or 2 and z is 1 or 2, provided that the sum of x, y and z is 3.

18. The liquid composition of claim 17 wherein x is 0, y is 2 and z is 1.

19. The liquid composition of claim 17 wherein $R^1$ and $R^2$ are lower alkyl groups.

20. The liquid composition of claim 19 wherein $R^1$ and $R^2$ are methyl groups.

21. The liquid composition of claim 17 wherein the organic lubricant is free of acetylenic and aromatic unsaturation.

22. A liquid composition comprising
    (A) from about 70 to about 99% by weight of 1,1,1,2-tetrafluoroethane; and
    (B) from about 1 to about 30% by weight of a soluble organic lubricant comprising at least one organic nitro compound characterized by the formula $$CH_2[N(R)CH_2C(R^1)(R^2)NO_2]_2 \qquad (II)$$

wherein R is a straight or branched chain alkyl or alkenyl group containing from 2 to about 20 carbon atoms, and $R^1$ and $R^2$ are each independently hydrogen or lower alkyl groups.

23. The liquid composition of claim 22 wherein $R^1$ and $R^2$ are methyl groups.

24. The liquid composition of claim 22 wherein the organic lubricant is free of acetylenic and aromatic unsaturation.

* * * * *